April 21, 1970    A. A. HASLIMANN ET AL    3,507,546
RADIAL ROLLER BEARINGS

Filed Feb. 26, 1968    2 Sheets-Sheet 1

INVENTORS
ALFRED LEHRER
Artur Alois Haslimann
John Morris
By Karl Wolfgang Roger

ATTORNEYS

April 21, 1970   A. A. HASLIMANN ET AL   3,507,546
RADIAL ROLLER BEARINGS
Filed Feb. 26, 1968                     2 Sheets-Sheet 2

INVENTORS
ALFRED LEHRER
Artur Alois Haslimann
John Morris
By Karl Wolfgang Roger

ATTORNEYS

United States Patent Office

3,507,546
Patented Apr. 21, 1970

3,507,546
RADIAL ROLLER BEARINGS
Artur Alois Haslimann, Swansea, Glamorgan, John Morris, Morriston, Swansea, Glamorgan, England, and Karl Wolfgang Röger, Borgomanero, Novaro, Italy, and Alfred Lehrer, Haguenau, France, assignors to Industriewerk Schaeffler OHG, Herzogenaurach, Germany, a corporation of Germany
Filed Feb. 26, 1968, Ser. No. 708,746
Claims priority, application Germany, Mar. 3, 1967, J 33,122, J 16,187
Int. Cl. F16c 33/34
U.S. Cl. 308—212          15 Claims

ABSTRACT OF THE DISCLOSURE

Radial roller bearing having an outer race and a number of rollers rolling thereon, which bearing serves to support a shaft oscillating through a specific angle only, the said shaft being provided with a recess extending about part of its circumference.

PRIOR ART

Until recently, sleeve bearings have been used for this type of mounting. For example in the automatic operation of disc-brakes in motor vehicles, the power generated by the manual brake pedal is applied to a shaft having a recess and by other intermediate means to the brake shoes. The sleeve bearings used until now for the installation of this shaft had first of all the disadvantage that the power to be applied on the brake pedal was relatively high due to the considerable bearing friction. Another factor became apparent in that not in all cases could it be reliably guaranteed that upon the release of the brake-lever, a lifting of the brake shoes would simultaneously occur since frequently the bearing friction in the sleeve bearings could not be overcome in this operation, resulting in the brake not being released. In addition to this problem, lubrication problems arose, since it is hardly possible to provide lubrication for the sleeve bearings which would last for the entire operational life of the bearings, and it is imperative to provide easy access to all lubricated elements in motor vehicles.

OBJECTS OF THE INVENTION

It is an object of the invention to provide novel radial bearings for mounting of shafts oscillating through a specific angle and having a recess about a portion of its circumference.

It is another object of the invention to provide novel radial bearings for mounting of shafts oscillating through a specific angle and having a recess about its circumference which recess is engaged with an external structural member.

These and other objects and advantages of the invention will become obvious from the following detailed description.

THE INVENTION

The radial roller bearings of the invention for mounting of a shaft oscillating through a specific angle and having a recess about a part of its circumference is comprised of an outer race and a plurality of rollers rolling on the outer race, the outer race being provided with rollers only over a portion thereof which is not greater than $$360° - \left(\alpha + \frac{\beta}{2}\right)$$

wherein $\alpha$ is the number of degrees over which the shaft recesses extend and $\beta$ is the number of degrees through which the shaft will oscillate.

This construction gives a perfectly functioning roller bearing in which the rollers are always between the outer race and the inner race formed by the shaft's surface in every operational stage but the rollers will not roll into the area of the bearing in which the shaft is provided with a recess. If the outer race were provided with rollers about its entire circumference, it would be necessary that these rollers, provided there is a sufficient radial fixation, would have to be introduced into the bearing surface area formed by the contact portion of the shaft each time the shaft was displaced which would lead to an uneven and often jerky rotation of the bearing which might damage the rollers on the edge of the recess of the shaft.

Obviously the rollers disposed in the outer race require an additional safety means always to keep the rollers during operation in the pre-determined position of between the shaft and the outer race but not between that portion of the shaft having the recess. One embodiment of the invention effects this by installing the rollers in a cage which optionally can be provided with an opening within the area of circumference where there are no rollers present. In another embodiment, the cage extends only about that part of the circumference in which the rollers are arranged. The latter embodiment is particularly advantageous for cages made by bending of a flat strip.

In a further embodiment, the rollers may be arranged without a cage in closely abutting relationship to each other in the race and a filler or spacer is provided to span the area in which the rollers are not to be present.

Whether using a cage or a spacer it is advantageous to provide the cage or spacer with a projection which extends into the shaft recess. This projection has to be of such dimension that it will allow the rollers to travel far enough for the movement of the shaft but not any further beyond that movement. The undesired travel of the rollers can also be prevented by providing the outer race with projections at those points of the circumference against which the rollers will abut before they arrive in the undesired area of the circumference.

In certain types of mountings of this general type, an external member must be allowed to engage the recess of the shaft in the area of the bearing itself. In the bearings of the invention, this may be effected by providing the bearing with an opening in the area thereof where the rollers are not present or by forming the outer race as a segment which extends only about a portion of the shaft.

Referring now to the drawings.

Figure 1:
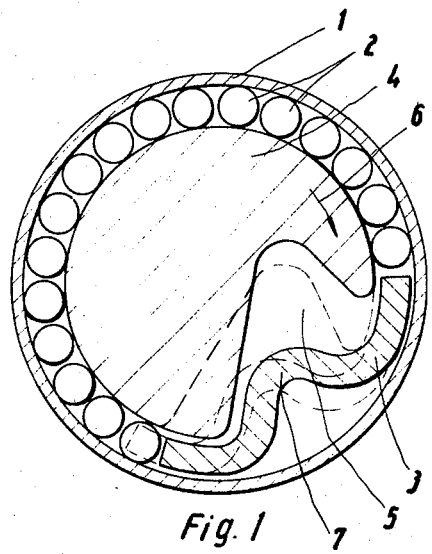
FIGS. 1 and 2 are a cross-sectional and longitudinal view, respectively of one bearing embodiment of the invention without a cage.
Figure 2:
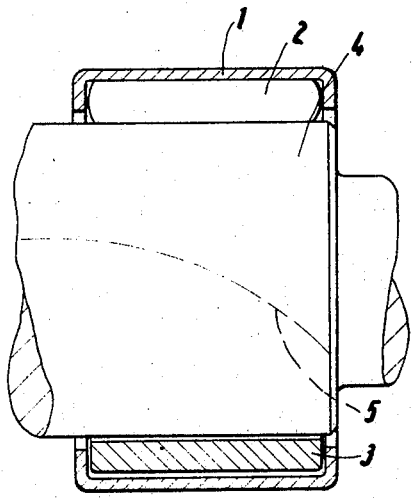

The bearing illustrated in FIGS. 1 and 2 consists of an outer race 1 and needle rollers 2 arranged therein. These rollers 2 fill only a portion of the race circumference and the rest is occupied by spacer 3. The inner race of the bearing is formed by the shaft 4 provided with a recess 5. The shaft executes only an oscillating motion through a specific angle and this motion is indicated in FIG. 1 by arrow 6. The position of the recess 5 after movement is complete is shown by the dotted line.

The spacer 3 has a projection 7 which penetrates into the recess 5 so that the bearing can be oscillated in relation to the shaft 4 only a specific distance so that rollers 2 never enter the area of recess 5. The position of spacer 3 after oscillation is completed is also indicated with a dotted line. FIG. 2 illustrates that recess 5 may be constructed by machining with a disc milling cutter, for example.

Figure 3:
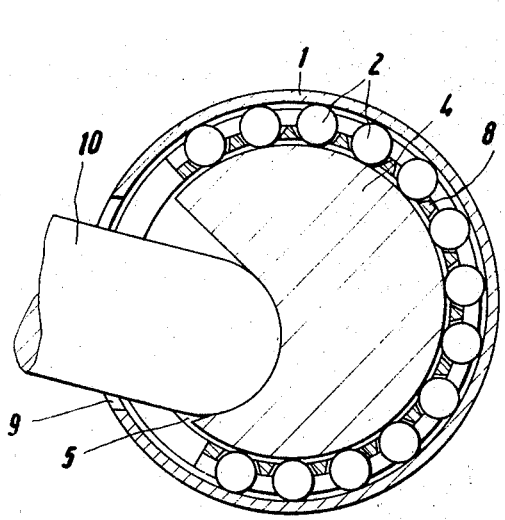
FIGS. 3 and 4 are a cross-sectional and longitudinal view, respectively, of one bearing embodiment of the invention having a cage.
Figure 4:
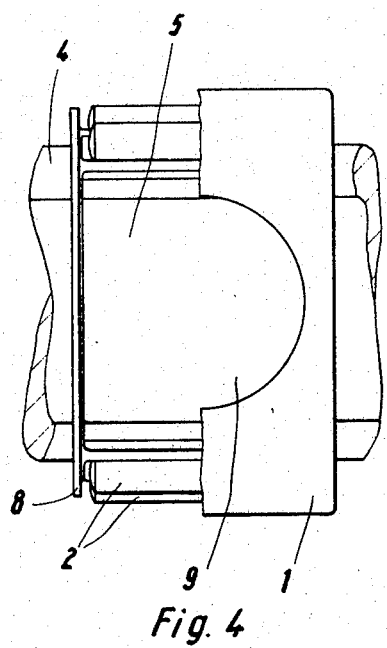

The embodiment of FIGS. 3 and 4 is similar to that of FIGS. 1 and 2 with regard to their basic construction as rollers 2 are disposed in an outer race 1 and the shaft 4 has a recess 5. But in contrast to the embodiment of FIGS. 1 and 2, the rollers 2 are arranged in pockets formed by crossbars and two end rings in a cage 8 and in the area of recess 5, the cage 8 has neither pockets nor rollers 2. The outer race 1 is provided in this area with an opening 9, which permits the entrance of a member 10 which is in engagement with the recess 5 of the shaft 4. A positioning of the roller raceway or the cage 8 in a peripheral direction becomes superfluous in this embodiment, since the said member 10 prevents any undesirable travel of the roller raceway.

Figure 5:
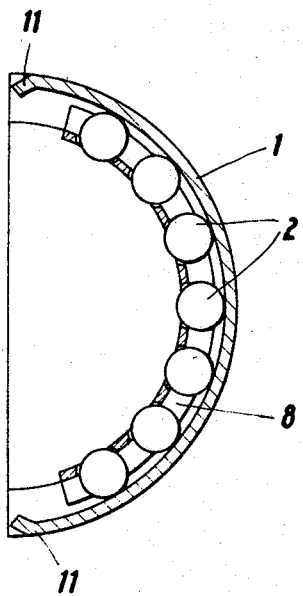
FIGS. 5 and 6 are a cross-sectional and longitudinal view, respectively of one bearing embodiment of the invention provided with a cage and in which the cage covers only a portion of the shaft surface.
Figure 6:
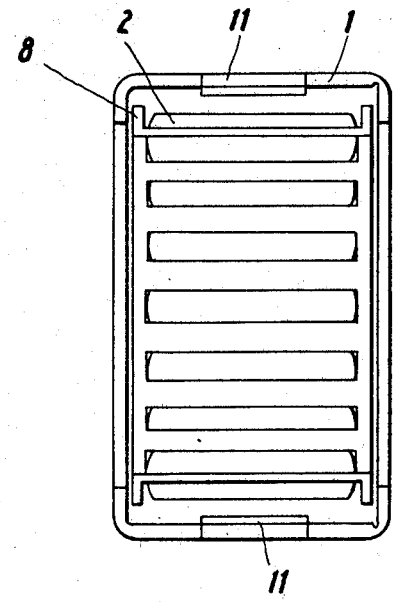

In the embodiment illustrated in FIGS. 5 and 6, the opening in the outer race described in FIGS. 3 and 4 has been enlarged so that the outer race 1 itself is developed only as a half shell. In this type of embodiment the outer race may extend over a greater or lesser number of degrees than the 180° shown here depending on the specific requirements of the bearing. In the semi-circular or half-shell race 1 rollers 2 are also arranged in a cage 8 and the positioning of the roller raceway in circumferential direction is effected by projections 11 which are constructed by deflected flanges of race 1.

Figure 7:
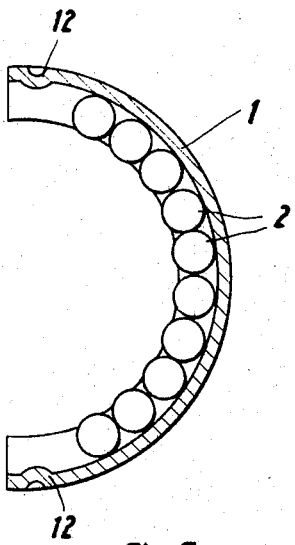
FIGS. 7 and 8 are a cross-sectional and longitudinal view, respectively, of one bearing embodiment of the invention in which the outer race covers only a portion of the shaft circumference.
Figure 8:
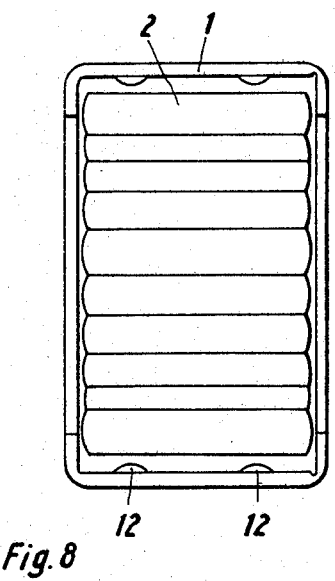

In the bearing of FIGS. 7 and 8, a semi-circular outer rate 1 is provided with rollers 2 arranged without a cage in closely abutting relation to one another. In this case, the positioning of the roller raceway is also effected by projections 2 in the semi-circular race 1 formed which projections 12 in this embodiment are shaped as studs or the like pressed into race 1.

The bearings of the invention need not be needle bearings but may use other types of rollers and it is not necessary that the outer race be made of sheet metal, thin-walled material and if a cage is to be used, any type of cage may be used.

Various modifications of the bearings of the invention may be made without departing from the spirit or scope thereof.

We claim:

1. A radial roller bearing mounting a shaft capable of oscillating a specific number of degrees and having a recess about a part of its circumference comprising an outer race which completely encircles the shaft and a plurality of rollers rolling on the outer race, the outer race being provided with rollers only over a portion thereof which is not greater than $360° - (\alpha + \beta/2)$ wherein $\alpha$ is the number of degrees over which the shaft recess extends and $\beta$ is the number of degrees through which the shaft will oscillate, and a spacer spanning the circumference in which the rollers are not present and over the shaft recess.

2. A bearing of claim 1 wherein the rollers are arranged in a cage.

3. A bearing of claim 2 wherein the cage is provided with an opening in the area of its circumference in which the rollers are not present.

4. A bearing of claim 2 wherein the cage extends only over that portion of the circumference wherein the rollers are arranged.

5. A bearing of claim 1 wherein the rollers are arranged in an abutting relationship to one another.

6. A bearing of claim 1 wherein the spacer is provided with a projection which extends into the recess of the shaft.

7. A bearing of claim 2 wherein the cage is provided with a projection which extends into the recess of the shaft.

8. A bearing of claim 1 wherein the outer race is provided with inwardly directed projections which limit the movement of the roller about the outer raceway.

9. A bearing of claim 1 wherein the race is provided with an opening in the area where the rollers are not present.

10. A roller bearing of claim 1 wherein the outer race extends only over a portion of the shaft circumference.

11. A radial roller bearing mounting a shaft capable of oscillating a specific number of degrees and having a recess about a part of its circumference comprising an outer race provided with an opening in the area of the shaft recess through which a structural member engages the shaft recess, a plurality of rollers rolling on the said outer race and a cage comprised of two end rings connected by a series of crossbars which form pockets for accommodating the rollers.

12. A bearing of claim 11 wherein the cage has no pockets in the area where there are no rollers.

13. A radial roller bearing mounting a shaft capable of oscillating a specific number of degrees and having a recess about a part of its circumference comprising an outer race provided with an opening in the area of the shaft recess through which a structural member engages the shaft recess, a plurality of rollers rolling on the said outer race and a cage provided with pockets for accommodation of the rollers and a projection on the outer race limiting the movement of the cage.

14. A bearing of claim 12 wherein the outer race extends only about a portion of the shaft circumference.

15. A radial roller bearing mounting a shaft capable of oscillating a specific number of degrees and having a recess about a part of its circumference comprising an outer race provided with an opening in the area of the shaft recess through which a structural member engages the shaft recess, a plurality of rollers rolling on the said outer race and arranged in an abutting relationship to one another and a spacer spanning the circumference in which the rollers are not present and over the shaft recess.

References Cited

UNITED STATES PATENTS

| 3,435,691 | 4/1969 | Cock et al. | 74—107 |
| 2,123,754 | 7/1938 | Talbot | 308—194 |

FOREIGN PATENTS

| 171,424 | 5/1960 | Sweden. |
| 132,423 | 5/1949 | Australia. |
| 665,241 | 1/1952 | Great Britain. |

MARTIN P. SCHWADRON, Primary Examiner

F. SUSKO, Assistant Examiner